United States Patent
Seder et al.

(10) Patent No.: US 12,523,861 B2
(45) Date of Patent: Jan. 13, 2026

(54) AUTOSTEREOSCOPIC CAMPFIRE DISPLAY

(71) Applicant: GM Global Technology Operations LLC, Detroit, MI (US)

(72) Inventors: Thomas A. Seder, Fraser, MI (US); Joseph F. Szczerba, Grand Blanc, MI (US); Tzvi Philipp, Bet Shemesh (IL); Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 449 days.

(21) Appl. No.: 18/325,255

(22) Filed: May 30, 2023

(65) Prior Publication Data

US 2024/0402483 A1   Dec. 5, 2024

(51) Int. Cl.
| | |
|---|---|
| *G02B 26/08* | (2006.01) |
| *B81B 7/02* | (2006.01) |
| *G03F 7/00* | (2006.01) |
| *G06F 3/01* | (2006.01) |

(52) U.S. Cl.
CPC ............ *G02B 26/0833* (2013.01); *B81B 7/02* (2013.01); *G03F 7/70291* (2013.01); *G06F 3/012* (2013.01); *G06F 3/013* (2013.01); *B81B 2201/042* (2013.01); *G02F 2203/12* (2013.01)

(58) Field of Classification Search
CPC ........ G02B 26/0833; G02B 27/0093; G02B 30/26; G02B 30/56; B81B 7/02; B81B 2201/042; G03F 7/70291; G06F 3/012; G06F 3/013; G02F 2203/12; H04N 13/32; H04N 13/365; H04N 13/383; H04N 13/398; G03H 1/0005
See application file for complete search history.

(56) References Cited

U.S. PATENT DOCUMENTS

| | | | |
|---|---|---|---|
| 2010/0027083 | A1 | 2/2010 | Kroll et al. |
| 2014/0055692 | A1 | 2/2014 | Kroll et al. |
| 2021/0070176 | A1* | 3/2021 | Rao .......................... G09G 3/36 |

FOREIGN PATENT DOCUMENTS

| | | |
|---|---|---|
| DE | 102008040578 A1 | 2/2010 |
| DE | 102022128426 A1 | 11/2023 |
| GB | 2610870 A | 3/2023 |

* cited by examiner

*Primary Examiner* — Charles S Chang
(74) *Attorney, Agent, or Firm* — Vivacqua Crane, PLLC

(57) ABSTRACT

A system for generating a floating image for a passenger within a vehicle includes a passenger monitoring system adapted to monitor the position of the passenger's head and eyes, a compute engine in communication with the passenger monitoring system and adapted to calculate a holographic image and encode the holographic image onto a spatial light modulator (SLM) of a picture generating unit (PGU) hologram generator, a beam steering device, wherein the beam steering device is adapted to receive, via the compute engine, information related to a position of the passenger's head and eyes from the passenger monitoring system, and the SLM is adapted to project the holographic image to the beam steering device and the beam steering device is adapted to re-direct the projected holographic image to the eyes of the passenger, based on the information received from the passenger monitoring system.

20 Claims, 5 Drawing Sheets

AUTOSTEREOSCOPIC CAMPFIRE DISPLAY

INTRODUCTION

The present disclosure relates to a system for generating a floating image viewable by a passenger within a vehicle.

Current entertainment systems within vehicles generally comprise a screen or monitor that is mounted within the vehicle for viewing by the passengers. Some systems include smaller individual screens, wherein each passenger has a screen for their personal viewing. Known systems incorporate inverse head-up-display architectures that use beams splitters that must be attached to structure within the vehicle compartment and must be constantly re-adjusted to accommodate height and position variations of the passenger within the vehicle compartment.

While current systems achieve their intended purpose, there is a need for a new and improved system for providing a floating three-dimensional image that appears centrally located within the vehicle to the passenger within the vehicle.

SUMMARY

According to several aspects of the present disclosure, a system for generating a floating image for a passenger within a vehicle includes a passenger monitoring system adapted to monitor the position of the passenger's head and eyes, a compute engine in communication with the passenger monitoring system and adapted to calculate a holographic image and encode the holographic image onto a spatial light modulator (SLM) of a picture generating unit (PGU) hologram generator, and a beam steering device, wherein the beam steering device is adapted to receive, via the compute engine, information related to a position of the passenger's head and eyes from the passenger monitoring system, and the SLM is adapted to project the holographic image to the beam steering device and the beam steering device is adapted to re-direct the projected holographic image to the eyes of the passenger, based on the information received from the passenger monitoring system.

According to another aspect, the compute engine is further adapted to encode a lens function into the holographic image based on information received from the passenger monitoring system.

According to another aspect, the holographic image comprises a single two-dimensional holographic image, and the beam steering device is adapted to re-direct the single two-dimensional holographic image directly to both a right eye of the passenger and a left eye of the passenger simultaneously, wherein the passenger perceives the two-dimensional holographic image floating within the vehicle in front of the passenger.

According to another aspect, the holographic image comprises a single two-dimensional holographic image, and the beam steering device is adapted to alternately re-direct the single two-dimensional holographic image directly to only a right eye of the passenger and then only to a left eye of the passenger, switching back and forth between the right eye and the left eye at a frequency greater than 30 Hz, wherein the passenger perceives the two-dimensional holographic image floating within the vehicle in front of the passenger.

According to another aspect, the beam steering device is a microelectromechanical systems (MEMS) mirror.

According to another aspect, the holographic image includes a right-eye image and a left-eye image, the compute engine is adapted to calculate the right-eye image and the left-eye image and to alternately encode the right-eye image onto the SLM and encode the left-eye image onto the SLM, switching back and forth between encoding the right-eye image and encoding the left-eye image at a frequency greater than 30 Hz, the SLM is adapted to project, alternately, at a frequency greater than 30 Hz and in sync with the compute engine, the right-eye image and the left-eye image to the beam steering device, and the beam steering device is adapted to, alternately, at a frequency greater than 30 Hz and in sync with the compute engine and the SLM, re-direct the right-eye image directly to the right eye of the passenger and re-direct the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

According to another aspect, the holographic image includes a right-eye image and a left-eye image, the SLM includes a right-eye SLM and a left-eye SLM, the beam steering device includes a right-eye mirror and a left-eye mirror, the compute engine is adapted to calculate the right-eye image and the left-eye image and to simultaneously encode the right-eye image onto the right-eye SLM and encode the left-eye image onto the left-eye SLM, the right-eye SLM and the left-eye SLM are adapted to project, simultaneously, the right-eye image to the right-eye mirror and the left-eye image to the left-eye mirror, and the right-eye mirror is adapted to re-direct the right-eye image directly to the right eye of the passenger, and, simultaneously, the left-eye mirror is adapted to re-direct the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

According to another aspect, the beam steering device is mounted within the vehicle adjacent to or above passenger seating that is opposite the passenger.

According to several aspects of the present disclosure, a method of generating a floating image for a passenger within a vehicle includes monitoring, with a passenger monitoring system, the position of the passenger's head and eyes, calculating, with a compute engine in communication with the passenger monitoring system, a holographic image and encoding the holographic image onto a spatial light modulator (SLM) of a picture generating unit (PGU) hologram generator, receiving, with a beam steering device, via the compute engine, information related to a position of the passenger's head and eyes from the passenger monitoring system, and projecting, with the SLM, the holographic image to the beam steering device, and, re-directing, with the beam steering device, the projected holographic image to the eyes of the passenger, based on the information received from the passenger monitoring system.

According to another aspect, the method further includes encoding, with the compute engine, a lens function into the holographic image based on information received from the passenger monitoring system.

According to another aspect, the calculating, with the compute engine, the holographic image further includes, calculating, with the compute engine, a single two-dimensional holographic image, and the re-directing, with the beam steering device, the projected holographic image to the eyes of the passenger further includes, re-directing, with the beam steering device, the single two-dimensional holographic image directly to both a right eye of the passenger and a left eye of the passenger simultaneously, wherein the passenger perceives the two-dimensional holographic image floating within the vehicle in front of the passenger.

According to another aspect, the calculating, with the compute engine, the holographic image further includes, calculating, with the compute engine, a single two-dimensional holographic image, and the re-directing, with the beam steering device, the projected holographic image to the eyes of the passenger further includes, alternately re-directing, with the beam steering device, the single two-dimensional holographic image directly to only a right eye of the passenger and then only to a left eye of the passenger, switching back and forth between the right eye and the left eye at a frequency greater than 30 Hz, wherein the passenger perceives the two-dimensional holographic image floating within the vehicle in front of the passenger.

According to another aspect, the holographic image includes a right-eye image and a left-eye image, and the calculating, with the compute engine, the holographic image further includes, calculating, with the compute engine, the right-eye image and the left-eye image, the encoding the holographic image onto the spatial light modulator (SLM) of the picture generating unit (PGU) hologram generator further includes alternately encoding, with the compute engine, the right-eye image onto the SLM and encoding, with the compute engine, the left-eye image onto the SLM, and switching back and forth between encoding the right-eye image and encoding the left-eye image at a frequency greater than 30 Hz, the projecting, with the SLM, the holographic image to the beam steering device further includes projecting, alternately, at a frequency greater than 30 Hz and in sync with the compute engine, the right-eye image and the left-eye image to the beam steering device, and the re-directing, with the beam steering device, the projected holographic image to the eyes of the passenger further includes alternately, at a frequency greater than 30 Hz and in sync with the compute engine and the SLM, re-directing, with the beam steering device, the right-eye image directly to the right eye of the passenger and re-directing, with the beam steering device, the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

According to another aspect, the holographic image includes a right-eye image and a left-eye image, the SLM includes a right-eye SLM and a left-eye SLM, and the beam steering device includes a right-eye mirror and a left-eye mirror, wherein the calculating, with the compute engine, the holographic image further includes calculating, with the compute engine, the right-eye image and the left-eye image, the encoding the holographic image onto the spatial light modulator (SLM) of the picture generating unit (PGU) hologram generator further includes simultaneously encoding, with compute engine, the right-eye image onto the right-eye SLM and encoding, with the compute engine, the left-eye image onto the left-eye SLM, the projecting, with the SLM, the holographic image to the beam steering device further includes simultaneously projecting, with the right-eye SLM and the left-eye SLM, the right-eye image to the right-eye mirror and the left-eye image to the left-eye mirror, and the re-directing, with the beam steering device, the projected holographic image to the eyes of the passenger further includes re-directing, simultaneously, with the right-eye mirror, the right-eye image directly to the right eye of the passenger, and, directing, with the left-eye mirror, the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

According to several aspects of the present disclosure, a vehicle having a system for generating a floating image for a passenger within the vehicle, the system including a passenger monitoring system adapted to monitor the position of the passenger's head and eyes, a compute engine in communication with the passenger monitoring system and adapted to calculate a holographic image, encode the holographic image onto a spatial light modulator (SLM) of a picture generating unit (PGU) hologram generator, and encode a lens function into the holographic image based on information received from the passenger monitoring system, and a beam steering device, wherein the beam steering device is adapted to receive, via the compute engine, information related to a position of the passenger's head and eyes from the passenger monitoring system, and the SLM is adapted to project the holographic image to the beam steering device and the beam steering device is adapted to re-direct the projected holographic image to the eyes of the passenger, based on the information received from the passenger monitoring system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
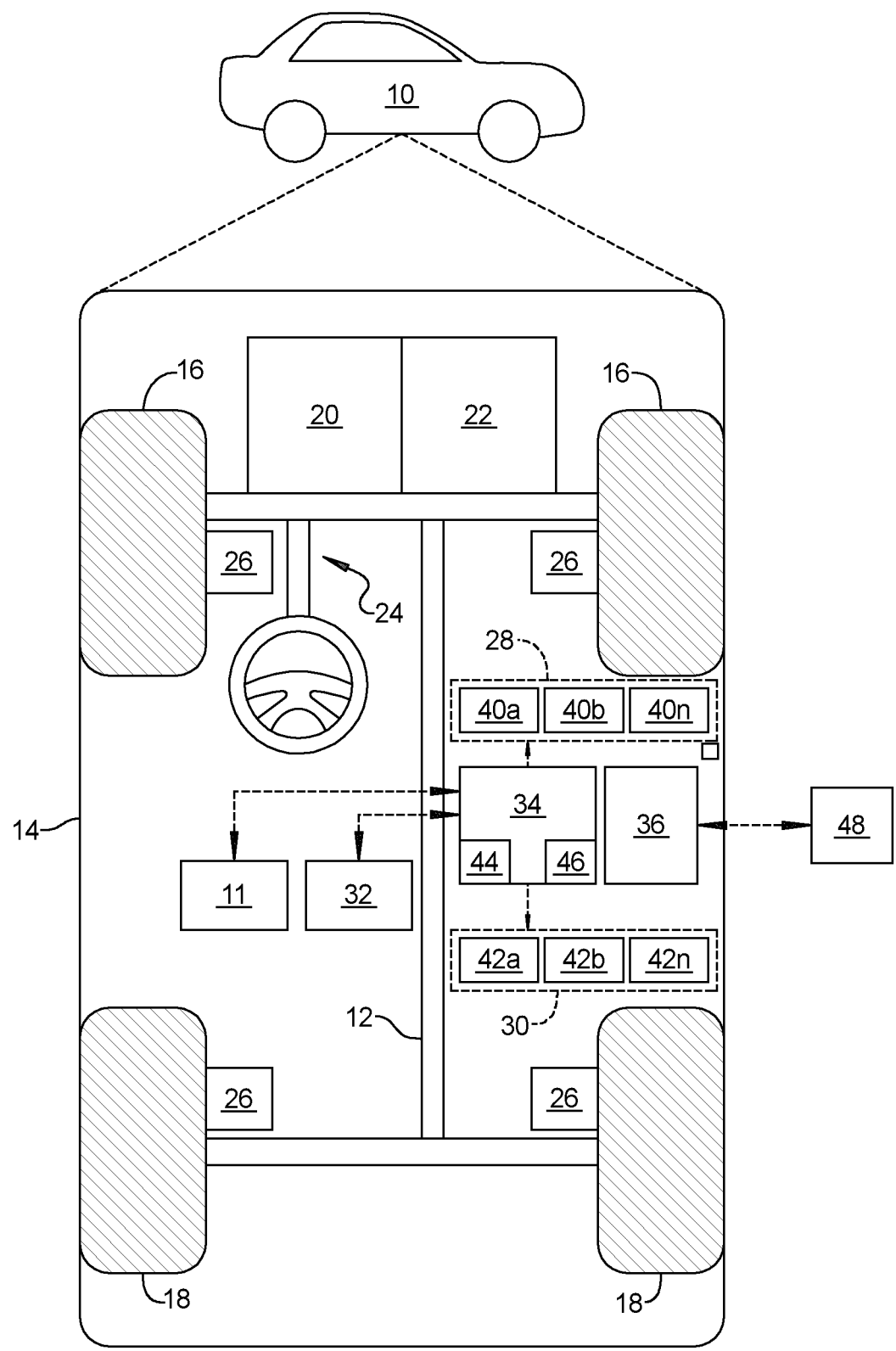
FIG. 1 is a schematic diagram of a vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for generating a floating image for a passenger within the vehicle 10 in accordance with various embodiments. In general, the system 11 for generating a floating image for the passenger within the vehicle 10 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensing devices 40a-40n can include sensors that monitor dynamic variables of the vehicle, such as its velocity, its acceleration, a number of times that the brake is applied, etc. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The communication system 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
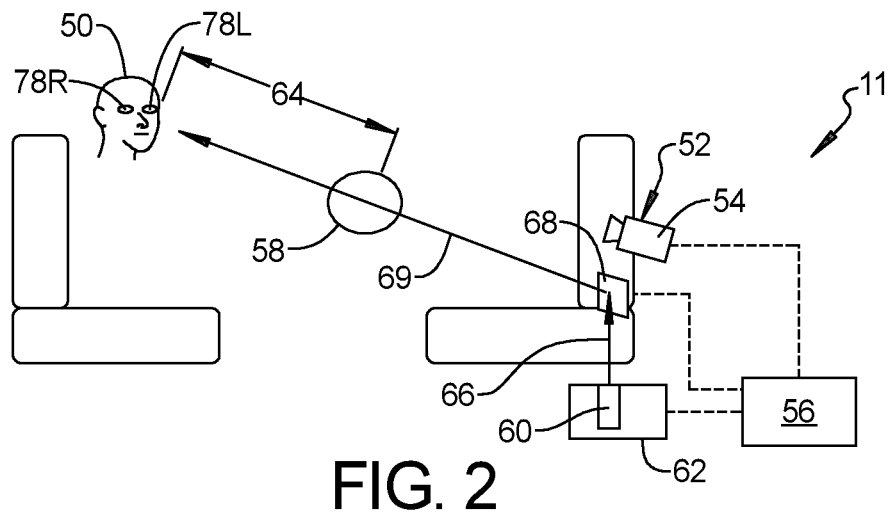
FIG. 2 is a schematic diagram of a system according to an exemplary embodiment of the present disclosure.

Referring to FIG. 2, the system 11 for generating a floating image for the passenger 50 within the vehicle 10 includes a passenger monitoring system 52 which includes a camera 54 that is adapted to monitor the position of the passenger's 50 head and eyes. A passenger monitoring system 52, often referred to as a driver monitoring system or DMS, is an artificial intelligence (AI)-based vehicle safety technology that monitors the passenger's 50 attentiveness through the camera 54. Purposes of the passenger monitoring system 52 is to identify the passenger and detect levels of vigilance through software and provide alerts in cases of drowsiness, distractions, etc. to avert accidents. The main features of DMS are driver ID, distraction detection, drowsiness detection, specific activity detection, eyeblink detection, emotion recognition and eyeball tracking. Used within the system 11 of the present disclosure, the primary purpose of the driver monitoring system 52 is to monitor the location of the eyes of the passenger 50 and the direction of the gaze of the passenger 50.

The system 11 further includes a compute engine 56 in communication with the passenger monitoring system 52 and adapted to calculate a holographic image 58 (phase hologram) and encode the holographic image 58 onto a spatial light modulator (SLM) 60 of a picture generating unit (PGU) hologram generator 62. The SLM 60 is irradiated with a light source, such as by way of non-limiting examples, RGB laser light or SLED light sources. When irradiated, each of the SLM pixels will produce a wavefront having a phase that corresponds to the phase of the position of the hologram encoded at that pixel.

In an exemplary embodiment, the compute engine 56 is further adapted to encode a lens function into the holographic image 58 based on information received from the passenger monitoring system 52. The passenger monitoring system 52 gathers information on the exact location of the eyes of the passenger 50 and determines an appropriate distance 64 at which the holographic image 58 should be perceived by the passenger 50. The multiple wavefronts exiting the SLM 60 constructive and destructively interfere with one another revealing a image pattern of the holographic image 58 at the appropriate distance 64 that is tunable by also encoding a lens function into the encoded holographic image. Thus, two pieces of information are encoded into the holographic image 58, the image information and the appropriate distance 64 at which the passenger 50 should perceive the holographic image 58 (the distance where the wavefronts come together to form the holographic image 58). Tunability of the appropriate distance 64 allows the system 11 to display the holographic image with variable virtual image distance. Holographic images with variable virtual image distance allows the system 11 to project a floating holographic image 58 to the passenger 50 with the capability of making the floating holographic image 58 appear closer or further away from the passenger 50.

The light exiting the SLM 60 travels along a path in a straight line, as indicated by arrow 66 until it encounters a beam steering device 68. In an exemplary embodiment, the beam steering device 68 includes a single turning mirror that is mounted onto an adjustable gimbal mount which receives information from the passenger monitoring system 52, via the compute engine 56, and re-directs the holographic image 58 to the passenger's 50 eye(s), as indicated by arrow 69. The passenger's 50 corneal lens Fourier transforms the holograms creating an image on the passenger's 50 retina. The holographic image 58 is perceived in front of the passenger 50 at the appropriate distance 64 from the passenger 50, as specified by the lens function encoded into the holographic image 58.

In an exemplary embodiment, the beam steering device 68 includes a microelectromechanical systems device. Micromirror devices are devices based on microscopically small mirrors. The mirrors are microelectromechanical systems (MEMS), which means that their states are controlled by applying a voltage between the two electrodes around the mirror arrays. Digital micromirror devices are used in video projectors and optics and micromirror devices for light deflection and control. The mirrors can not only be switched between two states, their rotation is in fact continuous. Thus, they can be used to control the intensity and direction of incident light. A MEMS scanning micromirror generally consists of a silicon device with a millimeter-scale mirror at the center. The mirror is typically connected to flexures that allow it to oscillate on a single axis or biaxially, to project or capture light. A primary advantage of using a MEMS device for the beam steering device 68 is that MEMS devices are very fast, allowing the direction of re-directed incident light to be changed very rapidly.

Figure 3:
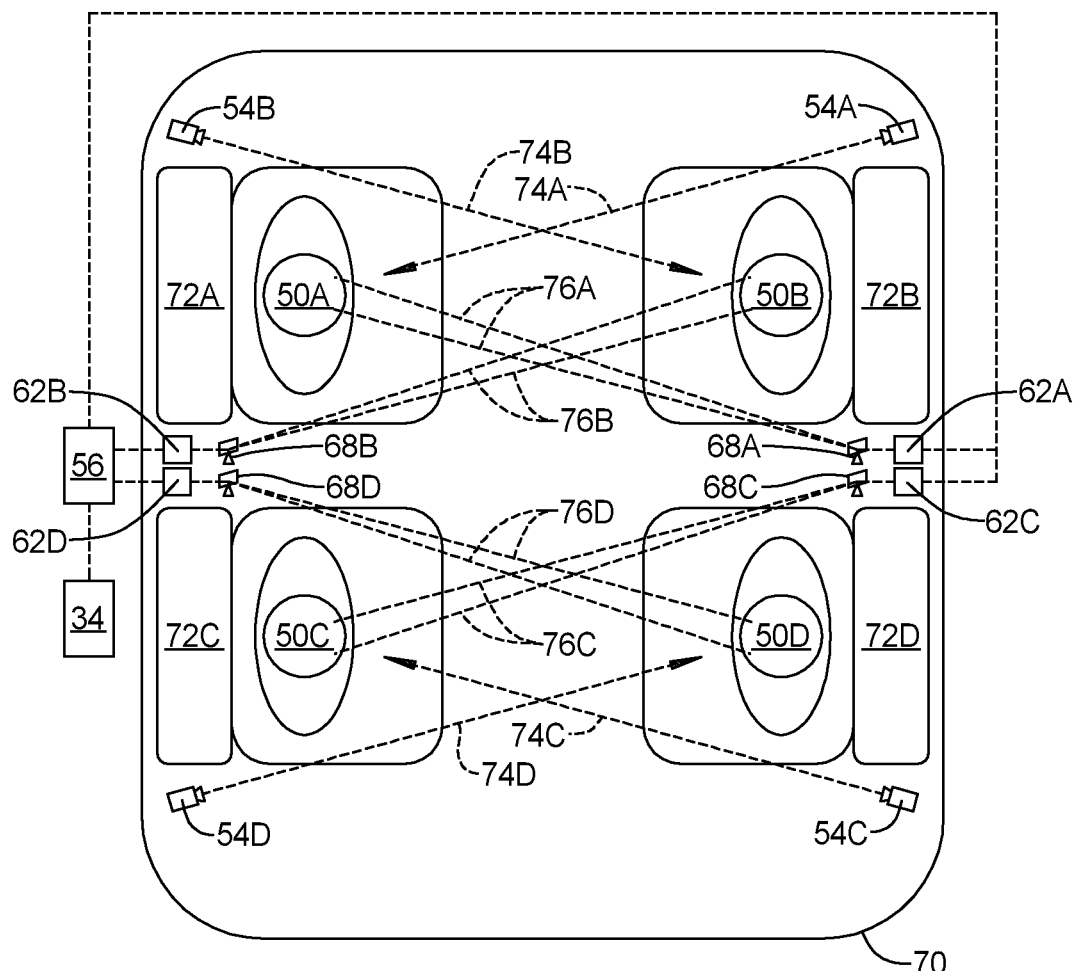
FIG. 3 is a schematic top view of a vehicle compartment wherein each of four passengers seated therein has access to a system according to an exemplary embodiment of the present disclosure.

Referring to FIG. 3, in an exemplary embodiment, a system 11 is provided for each passenger 50 within a vehicle compartment 70 of the vehicle 10. As shown, the vehicle compartment 70 includes a first seat 72A wherein a first passenger 50A is seated, a second seat 72B, wherein a second passenger 50B is seated, a third seat 72C, wherein a third passenger 50C is seated, and a fourth seat 72D, wherein a fourth passenger 50D is seated.

A first passenger monitoring system 54A monitors the location of the eyes of the first passenger 50A, as indicated by arrow 74A. A compute engine 56, a first PGU hologram generator 62A, and a first beam steering device 68A direct a first holographic image to the eyes of the first passenger 50A, as indicated by arrows 76A. A second passenger monitoring system 54B monitors the location of the eyes of the second passenger 50B, as indicated by arrow 74B. A compute engine 56, a second PGU hologram generator 62B, and a second beam steering device 68B direct a second holographic image to the eyes of the second passenger 50B, as indicated by arrows 76B. A third passenger monitoring system 54C monitors the location of the eyes of the third passenger 50C, as indicated by arrow 74C. A compute engine 56, a third PGU hologram generator 62C, and a third beam steering device 68C direct a third holographic image to the eyes of the third passenger 50C, as indicated by arrows 76C. A fourth passenger monitoring system 54D monitors the location of the eyes of the fourth passenger 50D, as indicated by arrow 74D. A compute engine 56, a fourth PGU hologram generator 62D, and a fourth beam steering device 68D direct a fourth holographic image to the eyes of the fourth passenger 50D, as indicated by arrows 76D.

As shown in FIG. 3, a single compute engine 56 supports the first, second, third and fourth passenger monitoring system 54A, 54B, 54C, 54D, the first, second, third and fourth PGU hologram generators 62A, 62B, 62C, 62D, the first, second, third and fourth beam steering devices 68A, 68B, 68C, 68D. It should be understood that first, second, third and fourth compute engines could be utilized without departing from the scope of the present disclosure.

Referring again to FIG. 2, in an exemplary embodiment, the holographic image 58 comprises a single two-dimensional holographic image. The single two-dimensional holographic image is a large image, such that the beam steering device 68 is adapted to re-direct the single two-dimensional holographic image directly to both a right eye 78R of the passenger 50 and a left eye 78L of the passenger 50 simultaneously, wherein the passenger 50 perceives the two-dimensional holographic image floating within the vehicle 10 in front of the passenger 50, at the appropriate distance 64.

Figure 4:
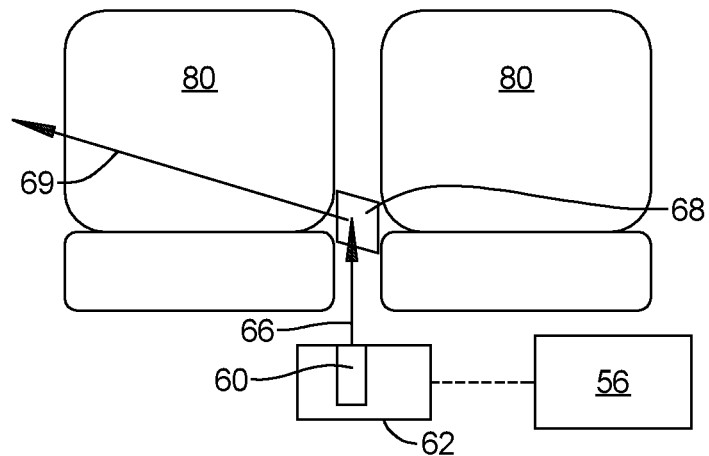
FIG. 4 is a front schematic view of two seats within a vehicle wherein a beam steering device of a system according to an exemplary embodiment is positioned between the two seats.

Referring to FIG. 4, in an exemplary embodiment, the beam steering device 68 is mounted within the vehicle 10 adjacent to or above passenger seating 80A, 80B that is opposite the passenger 50. As shown in FIG. 4, the beam steering device 68 is positioned between two seats 80A, 80B that are directly across from a seat that the passenger is seated in. This positions the beam steering device 68 at a horizontal and vertical position that provides optimal opportunity for the beam steering device 68 to re-direct the holographic image directly to the eyes 78R, 78L of the passenger 50.

Referring again to FIG. 3, the beam steering devices 68A, 68C are positioned between the second and fourth seats 72B, 72D, and the beam steering devices 68B, 68D are positioned between the first and third seats 72A, 72C. It should be understood that the beam steering devices 68A, 68B, 68C, 68D could also be positioned higher up within the vehicle 10, above the first, second, third and fourth seats 72A, 72B, 72C, 72D. The primary issue when placing the PGU hologram generators 62A, 62B, 62C, 62D and the first, second, third and fourth beam steering devices 68A, 68B, 68C, 68D is ensuring that passengers 50A, 50B, 50C, 50D seated within the first, second, third and fourth seats 72A, 72B, 72C, 72D do not block the re-direction of the holographic images to the other passengers 50A, 50B, 50C, 50D.

Figure 5:
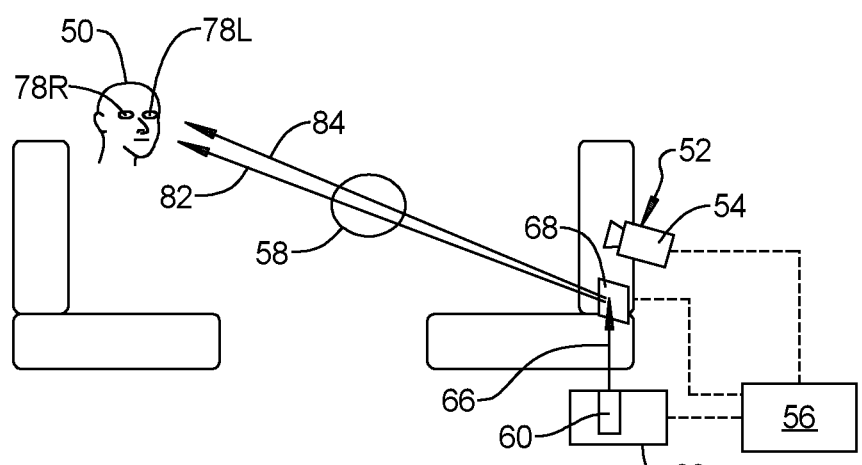
FIG. 5 is a schematic view of a system according to an exemplary embodiment wherein a beam steering device is adapted to switch back and forth between right and left eyes of a passenger.

Referring to FIG. 5, in another exemplary embodiment, the holographic image 58 comprises a single two-dimensional holographic image, and the beam steering device 68 is adapted to alternately re-direct the single two-dimensional holographic image 58 directly to only a right eye 78R of the passenger 50, as indicated by arrow 82, and then only to a left eye 78L of the passenger 50, as indicated by arrow 84, switching back and forth between the right eye 78R and the left eye 78L at a frequency greater than 30 Hz. This is known as sequential time-multiplexing. Sequential time-multiplexing requires the beam steering device 68 to be capable of switching the direction of the re-directed holographic image, back and forth between the right eye 78R and the left eye 78L, fast enough to eliminate any perceptible image flicker by the viewing passenger 50.

In an exemplary embodiment, the beam steering device 68 is adapted to sequentially re-direct the holographic image 58 to the right eye 78R, as indicated by arrow 82, for less than 33 µs. After 33 µs, the beam steering device 68 adjusts, and begins re-directing the holographic image 58 to the left eye 78L, as indicated by arrow 84. The holographic image 58 is re-directed to the left eye 78L for less than 33 µs. This process is repeated, by alternating between re-directing the holographic image 58 to the right eye 78R for less than 33 µs, and re-directing the holographic image 58 to the left eye 78L for less than 33 µs.

If the frequency of switching between re-directing the holographic image 58 to the right eye 78R and the left eye 78L is greater than 30 Hz, flicker will not be perceptible by the passenger 50, and the holographic image 58 perceived by the right eye 78R and the left eye 78L of the passenger 50 will be fused into one image, as perceived by the passenger 50. A frequency of 30 Hz translates to switching between the right eye 78R and the left eye 78L every 33 µs. For this embodiment, a MEMS beam steering device 68 will work. Gimble based beam steering devices 68 are not able to switch the direction of re-direction fast enough to avoid the passenger being conscious of the switch. A MEMS beam steering device 68, by way of non-limiting example, is capable of switching fast enough that the passenger will not be aware of the switch, and will perceive that they are seeing the holographic image 58 simultaneously with both the right eye 78R and the left eye 78L.

Figure 6:
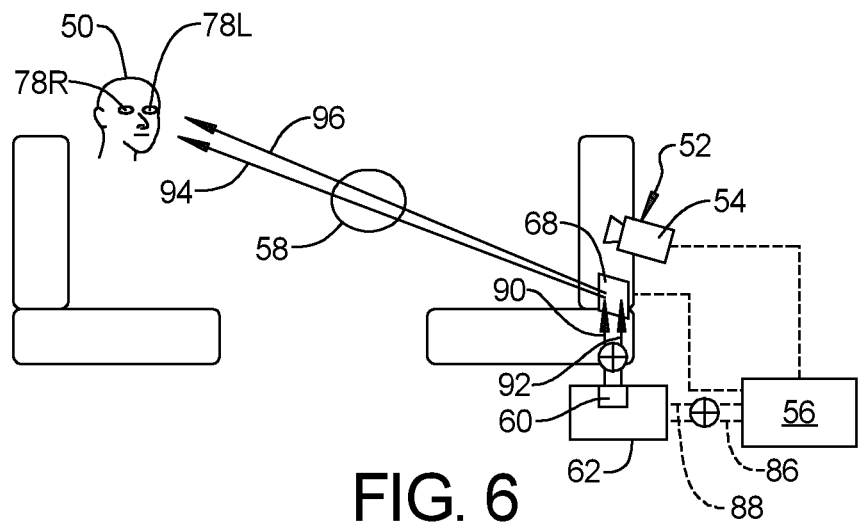
FIG. 6 is a schematic view of a system according to an exemplary embodiment wherein a compute engine is adapted to encode a right eye image and a left eye image to an SLM.

Referring to FIG. 6, in another exemplary embodiment, the holographic image 58 includes a right-eye image and a left-eye image. The compute engine 56 is adapted to calculate the right-eye image and the left-eye image and to alternately encode the right-eye image onto the SLM, as shown by line 86, and to encode the left-eye image onto the SLM, as shown by line 88, switching back and forth between encoding the right-eye image and encoding the left-eye image at a frequency greater than 30 Hz.

The SLM 60 is adapted to project, alternately, at a frequency greater than 30 Hz and in sync with the compute engine 56, the right-eye image to the beam steering device 68, as indicated by arrow 90, and the left-eye image to the beam steering device 68, as indicated by arrow 92. The SLM 60 is in sync with the compute engine 56, wherein, when the compute engine 56 is encoding the right eye image to the SLM 60, as indicated by line 86, the SLM 60 is projecting the right eye image to the beam steering device 68, as indicated by arrow 90, and, when the compute engine 56 is encoding the left eye image to the SLM 60, as indicated by line 88, the SLM 60 is projecting the left eye image to the beam steering device 68, as indicated by arrow 92.

The beam steering device 68 is adapted to, alternately, at a frequency greater than 30 Hz and in sync with the compute engine 56 and the SLM 60, re-direct the right-eye image directly to the right eye 78R of the passenger 50, as indicated by arrow 94, and, to re-direct the left-eye image directly to the left eye 78L of the passenger 50, as indicated by arrow 96. The right-eye image and the left-eye image are slightly different perspectives of a single image such that when the right eye 78R of the passenger 50 receives the right-eye image and the left eye 78L of the passenger 50 receives the left-eye image, the passenger 50 perceives a three-dimensional holographic image 58 floating within the vehicle 10 in front of the passenger 50.

This provides an autostereoscopic three-dimensional display by adding binocular perception of three-dimensional depth without the use of special headgear, glasses, something that affects the viewer's vision, or anything for the viewer's eyes. Because headgear is not required, autostereoscopic displays are also referred to as "glasses-free 3D" or "glassesless 3D".

The beam steering device 68 is in sync with the SLM 60 and the compute engine 56, wherein, when the compute engine 56 is encoding the right eye image to the SLM 60, as indicated by line 86, the SLM 60 is projecting the right eye image to the beam steering device 68, as indicated by arrow 90, and the beam steering device 68 is re-directing the right eye image to the right eye 78R of the passenger 50, as indicated by arrow 94. Further, when the compute engine 56 is encoding the left eye image to the SLM 60, as indicated by line 88, the SLM 60 is projecting the left eye image to the beam steering device 68, as indicated by arrow 92, and the beam steering device 68 is re-directing the left eye image to the left eye 78L of the passenger, as indicated by arrow 96.

For this embodiment, a MEMS beam steering device 68, by way of non-limiting example, is capable of switching fast enough that the passenger 50 will not be aware of the switch, and will perceive that they are seeing the right eye image and the left eye image simultaneously with both the right eye 78R and the left eye 78L, and will fuse the right eye image and the left eye image into the perceived three-dimensional holographic image 58 floating within the vehicle 10 in front of the passenger 50.

Figure 7:
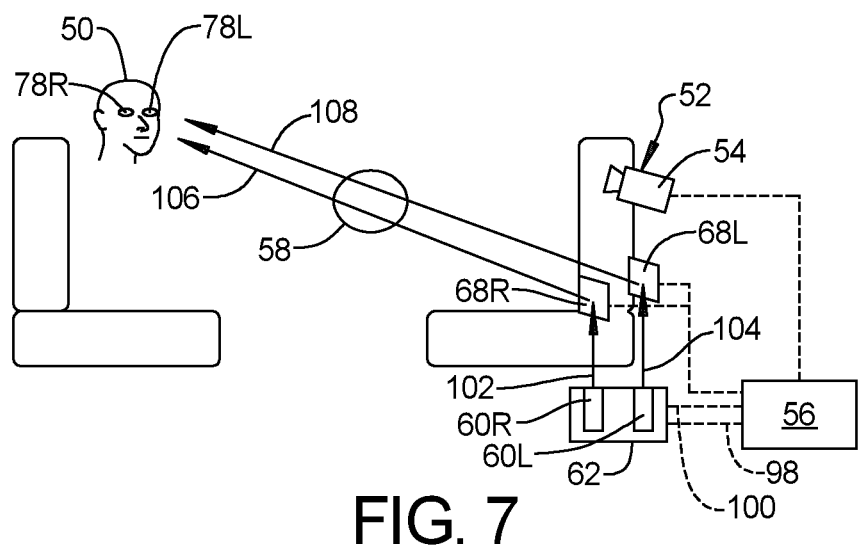
FIG. 7 is a schematic view of a system according to an exemplary embodiment including a right eye SLM, a left eye SLM, a right eye beam steering device, and a left eye beam steering device.

Referring to FIG. 7, in another exemplary embodiment, the holographic image 58 includes a right-eye image and a left-eye image, the SLM 60 includes a right-eye SLM 60R and a left-eye SLM 60L, and the beam steering device 68 includes a right-eye mirror 68R and a left-eye mirror 68L.

The compute engine 56 is adapted to calculate the right-eye image and the left-eye image and to simultaneously encode the right-eye image onto the right eye SLM 60R, as shown by line 98, and to encode the left-eye image onto the left eye SLM 60L, as shown by line 100. The right-eye SLM 60R and the left-eye SLM 60L are adapted to project, simultaneously, the right-eye image to the right-eye mirror 68R, as indicated by arrow 102, and the left-eye image to the left-eye mirror 68L, as indicated by arrow 104.

Both the right eye mirror 68R and the left eye mirror 68L may be, by way of non-limiting example, a gimble mounted reflector, a MEMS device, or any other suitable beam steering mechanism. The right-eye mirror 68R is adapted to re-direct the right-eye image directly to the right eye 78R of the passenger 50, as indicated by arrow 106, and, simultaneously, the left-eye mirror 68L is adapted to re-direct the left-eye image directly to the left eye 78L of the passenger 50, as indicated by arrow 108, wherein the right-eye image and the left-eye image are slightly different perspectives of a single image such that when the right eye 78R of the passenger 50 receives the right-eye image and the left eye 78L of the passenger 50 receives the left-eye image, the passenger's right eye 78R and left eye 78L will fuse the right eye image and the left eye image into the perceived three-dimensional holographic image 58 floating within the vehicle 10 in front of the passenger 50. In another exemplary embodiment, the right eye image and the left eye image are the same image, and thus, the passenger perceives a two-dimensional holographic image 58 floating within the vehicle 10 in front of the passenger 50.

Figure 8:
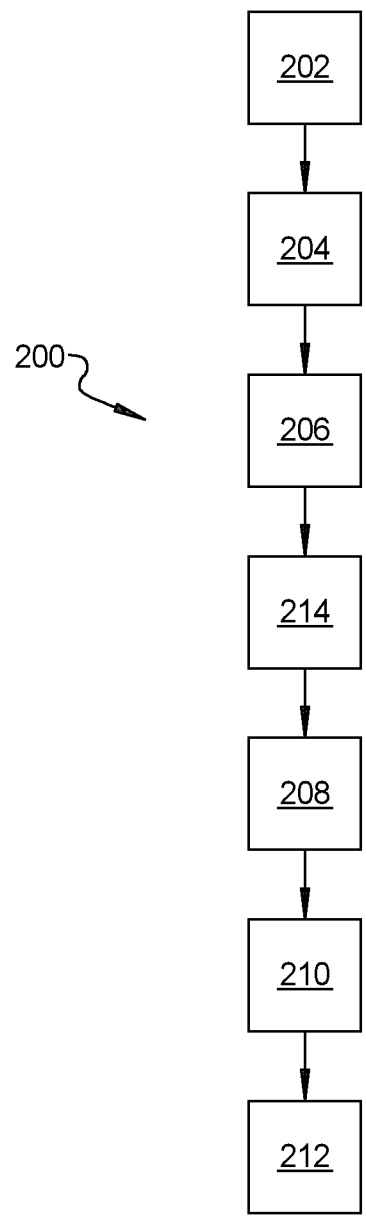
FIG. 8 is a schematic flow chart illustrating a method according to an exemplary embodiment of the present disclosure.

Referring to FIG. 8, a method 200 of generating a floating image for a passenger 50 within a vehicle 10, includes, starting at block 202, monitoring, with a passenger monitoring system 52, the position of the passenger's 50 head and eyes, moving to block 204, calculating, with a compute engine 56 in communication with the passenger monitoring system 52, a holographic image 58 and, moving to block 206, encoding the holographic image 58 onto a spatial light modulator (SLM) 60 of a picture generating unit (PGU) hologram generator 62.

Moving to block 208, the method 200 further includes, receiving, with a beam steering device 68, via the compute engine 56, information related to a position of the passenger's 50 head and eyes from the passenger monitoring system 52, and, moving to block 210, projecting, with the SLM 60, the holographic image 58 to the beam steering device 68, and, moving to block 212, re-directing, with the beam steering device 68, the projected holographic image 58 to the eyes 78R, 78L of the passenger 50, based on the information received from the passenger monitoring system 52.

In an exemplary embodiment, the method 200 further includes, moving to block 214, encoding, with the compute engine 56, a lens function into the holographic image 58 based on information received from the passenger monitoring system 52.

In another exemplary embodiment, the calculating, with the compute engine 56, the holographic image 58 at block 204 further includes, calculating, with the compute engine 56, a single two-dimensional holographic image, and the re-directing, with the beam steering device 68, the projected holographic image 58 to the eyes 78R, 78L of the passenger 50 at block 212 further includes, re-directing, with the beam steering device 68, the single two-dimensional holographic image directly to both a right eye 78R of the passenger and a left eye 78L of the passenger 50 simultaneously, wherein the passenger 50 perceives the two-dimensional holographic image floating within the vehicle 10 in front of the passenger 50.

In another exemplary embodiment, the calculating, with the compute engine 56, the holographic image 58 at block 204 further includes, calculating, with the compute engine 56, a single two-dimensional holographic image, and the re-directing, with the beam steering device 68, the projected holographic image 58 to the eyes 78R, 78L of the passenger 50 at block 212 further includes, alternately re-directing, with the beam steering device 68, the single two-dimensional holographic image directly to only a right eye 78R of the passenger 50 and then only to a left eye 78L of the passenger 50, switching back and forth between the right eye 78R and the left eye 78L at a frequency greater than 30 Hz, wherein the passenger 50 perceives the two-dimensional holographic image 58 floating within the vehicle 10 in front of the passenger 50.

In another exemplary embodiment, the holographic image 58 includes a right-eye image and a left-eye image, and the calculating, with the compute engine 56, the holographic image 58 at block 204 further includes, calculating, with the compute engine 56, the right-eye image and the left-eye image. The encoding the holographic image 58 onto the spatial light modulator (SLM) 60 of the picture generating unit (PGU) hologram generator 62 at block 206 further includes alternately encoding, with the compute engine 56, the right-eye image onto the SLM 60 and encoding, with the compute engine 56, the left-eye image onto the SLM 60, and switching back and forth between encoding the right-eye image and encoding the left-eye image at a frequency greater than 30 Hz. The projecting, with the SLM 60, the holographic image 58 to the beam steering device 68 at block 210 further includes projecting, alternately, at a frequency greater than 30 Hz and in sync with the compute engine 56, the right-eye image and the left-eye image to the beam steering device 68. The re-directing, with the beam steering device 68, the projected holographic image 58 to the eyes 78R, 78L of the passenger 50 at block 212 further includes alternately, at a frequency greater than 30 Hz and in sync with the compute engine 56 and the SLM 60, re-directing, with the beam steering device 68, the right-eye image directly to the right eye 78R of the passenger 50 and re-directing, with the beam steering device 68, the left-eye image directly to the left eye 78L of the passenger 50, wherein the right-eye image and the left-eye image are slightly different perspectives of a single image such that when the right eye 78R of the passenger 50 receives the right-eye image and the left eye 78L of the passenger 50 receives the left-eye image, the passenger 50 perceives a three-dimensional image floating within the vehicle 10 in front of the passenger 50.

In another exemplary embodiment, the holographic image 58 includes a right-eye image and a left-eye image, the SLM 60 includes a right-eye SLM 60R and a left-eye SLM 60L, and the beam steering device 68 includes a right-eye mirror 68R and a left-eye mirror 68L. The calculating, with the compute engine 56, the holographic image 58 at block 204 further includes calculating, with the compute engine 56, the right-eye image and the left-eye image. The encoding the holographic image 58 onto the spatial light modulator (SLM) 60 of the picture generating unit (PGU) hologram generator 62 at block 206 further includes simultaneously encoding, with compute engine 56, the right-eye image onto the right-eye SLM 60R and encoding, with the compute engine 56, the left-eye image onto the left-eye SLM 60L. The projecting, with the SLM 60, the holographic image 58 to the beam steering device 68 at block 210 further includes simultaneously projecting, with the right-eye SLM 60R and the left-eye SLM 60L, the right-eye image to the right-eye mirror 68R and the left-eye image to the left-eye mirror 68L. The re-directing, with the beam steering device 68, the projected holographic image 58 to the eyes 78R, 78L of the passenger 50 at block 212 further includes re-directing, simultaneously, with the right-eye mirror 68R, the right-eye image directly to the right eye 78R of the passenger 50, and, directing, with the left-eye mirror 68L, the left-eye image directly to the left eye 78L of the passenger 50, wherein the right-eye image and the left-eye image are slightly different perspectives of a single image such that when the right eye 78R of the passenger 50 receives the right-eye image and the left eye 78L of the passenger 50 receives the left-eye image, the passenger 50 perceives a three-dimensional image floating within the vehicle 10 in front of the passenger 50.

A system 11 and method 200 of the present disclosure offers several advantages. These include providing either a two-dimensional or three-dimensional holographic image floating at a position within the vehicle 10 in front of the passenger 50.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a floating image for a passenger within a vehicle, comprising:
   a passenger monitoring system adapted to monitor the position of the passenger's head and eyes;
   a compute engine in communication with the passenger monitoring system and adapted to calculate a holographic image and encode the holographic image onto a spatial light modulator (SLM) of a picture generating unit (PGU) hologram generator, the holographic image including a right-eye image and a left-eye image, the compute engine is adapted to calculate the right-eye image and the left-eye image and to alternately encode the right-eye image onto the SLM and encode the left-eye image onto the SLM, switching back and forth between encoding the right-eye image and encoding the left-eye image at a frequency greater than 30 Hz; and
   a beam steering device, wherein:
      the beam steering device is adapted to receive, via the compute engine, information related to a position of the passenger's head and eyes from the passenger monitoring system;
      the SLM is adapted to project, alternately, at a frequency greater than 30 Hz and in sync with the compute engine, the right-eye image and the left-eye image to the beam steering device; and
      the beam steering device is adapted to, alternately, at a frequency greater than 30 Hz and in sync with the compute engine and the SLM, re-direct the right-eye image directly to the right eye of the passenger and re-direct the left-eye image directly to the left eye of the passenger, based on the information received from the passenger monitoring system.

2. The system of claim 1, wherein the compute engine is further adapted to encode a lens function into the right-eye image and the left-eye image based on information received from the passenger monitoring system.

3. The system of claim 2, wherein the holographic image comprises a single two-dimensional holographic image, the right-eye image and the left-eye image being the same two-dimensional holographic image, and the beam steering device is adapted to alternately re-direct the single two-dimensional holographic image directly to only a right eye of the passenger and then only to a left eye of the passenger, switching back and forth between the right eye and the left eye at a frequency greater than 30 Hz, wherein the passenger perceives the two-dimensional holographic image floating within the vehicle in front of the passenger.

4. The system of claim 3, wherein the beam steering device is a microelectromechanical systems (MEMS) mirror.

5. The system of claim 2, wherein:
the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

6. The system of claim 5, wherein the beam steering device is a microelectromechanical systems (MEMS) mirror.

7. The system of claim 1, wherein the beam steering device is mounted within the vehicle adjacent to or above passenger seating that is opposite the passenger.

8. A vehicle having a system for generating a floating image for a passenger within the vehicle, the system comprising:
a passenger monitoring system adapted to monitor the position of the passenger's head and eyes;
a compute engine in communication with the passenger monitoring system and adapted to:
calculate a holographic right eye image and a holographic left eye image; and
encode the holographic right eye image onto a spatial light modulator (SLM) of a picture generating unit (PGU) hologram generator and encode the holographic left eye image onto the SLM, switching back and forth between encoding the right-eye image and encoding the left-eye image at a frequency greater than 30 Hz; and
a beam steering device, wherein:
the beam steering device is adapted to receive, via the compute engine, information related to a position of the passenger's head and eyes from the passenger monitoring system; and
the SLM is adapted to project, alternately, at a frequency greater than 30 Hz and in sync with the compute engine, the right-eye image and the left-eye image to the beam steering device and the beam steering device is adapted to, alternately, at a frequency greater than 30 Hz and in sync with the compute engine and the SLM, re-direct the right-eye image directly to the right eye of the passenger and re-direct the left-eye image directly to the left eye of the passenger, based on the information received from the passenger monitoring system.

9. The vehicle of claim 8, wherein the holographic image comprises a single two-dimensional holographic image, the right-eye image and the left-eye image being the same two-dimensional holographic image, and the beam steering device is adapted to
alternately re-direct the single two-dimensional holographic image directly to only a right eye of the passenger and then only to a left eye of the passenger, switching back and forth between the right eye and the left eye at a frequency greater than 30 Hz, wherein the passenger perceives the two-dimensional holographic image floating within the vehicle in front of the passenger.

10. The system of claim 9, wherein the beam steering device is a microelectromechanical systems (MEMS) mirror.

11. The vehicle of claim 8, wherein:
the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

12. The system of claim 11, wherein the beam steering device is a microelectromechanical systems (MEMS) mirror.

13. The vehicle of claim 8, wherein the beam steering device is mounted within the vehicle adjacent to or above passenger seating that is opposite the passenger.

14. The system of claim 8, wherein the compute engine is further adapted to encode a lens function into the holographic right eye image and the holographic left eye image based on information received from the passenger monitoring system.

15. The system of claim 14, wherein the lens function encoded into each of the right eye image and the left eye image is adapted such that the right eye image and the left eye image are perceived in front of the passenger at an appropriate distance from the passenger.

16. A system for generating a floating image for a passenger within a vehicle, comprising:
a passenger monitoring system adapted to monitor the position of the passenger's head and eyes;
a compute engine in communication with the passenger monitoring system and adapted to calculate a right eye holographic image and encode the right eye holographic image onto a right eye spatial light modulator (SLM) of a picture generating unit (PGU) hologram generator and simultaneously calculate a left eye holographic image and encode the left eye holographic image onto a left eye SLM of the picture generating unit (PGU) hologram generator; and
a beam steering device comprising a right-eye mirror and a left-eye mirror, wherein:
the beam steering device is adapted to receive, via the compute engine, information related to a position of the passenger's head and eyes from the passenger monitoring system;
the right-eye SLM and the left-eye SLM are adapted to project, simultaneously, the right-eye image to the right-eye mirror and the left-eye image to the left-eye mirror; and
the right-eye mirror is adapted to re-direct the right-eye image directly to the right eye of the passenger, and, simultaneously, the left-eye mirror is adapted to re-direct the left-eye image directly to the left eye of the passenger, wherein the right-eye image and the left-eye image are slightly different perspectives of a single image such that when the right eye of the passenger receives the right-eye image and the left eye of the passenger receives the left-eye image, the passenger perceives a three-dimensional image floating within the vehicle in front of the passenger.

17. The system of claim 16, wherein the compute engine is further adapted to encode a lens function into the right-eye image and the left-eye image based on information received from the passenger monitoring system.

18. The system of claim 17, wherein the lens function encoded into each of the right eye image and the left eye image is adapted such that the right eye image and the left eye image are perceived in front of the passenger at an appropriate distance from the passenger.

19. The system of claim 17, wherein the beam steering device is a microelectromechanical systems (MEMS) mirror.

20. The system of claim 16, wherein the beam steering device is mounted within the vehicle adjacent to or above passenger seating that is opposite the passenger.

* * * * *